July 27, 1954 N. W. KIRCHER 2,684,875
ROPE HOOK
Filed Oct. 31, 1950

INVENTOR.
NEVIN W KIRCHER.
BY
Oberlin + Limbach
ATTORNEYS.

Patented July 27, 1954

2,684,875

UNITED STATES PATENT OFFICE 2,684,875

ROPE HOOK

Nevin W. Kircher, Covington, Ky., assignor to The Standard Oil Company, Cleveland, Ohio, a corporation of Ohio Application October 31, 1950, Serial No. 193,193

4 Claims. (Cl. 304—1)

In various situations, it is desired to make a connection from one rope to another, quickly and with security of holding. For example, in the case of men working on scaffolds, it is known practice to have a suspended safety line alongside, and heretofore connection has been made from a belt worn by the workman to such suspended rope by complicated tie-in. Such means requires a disproportionate time and effort in un-tying, when it is desired to release the connection; and such means does not always afford a satisfactory and sufficiently safe connection in the first instance. By the present invention, a connection from one rope to another may be had which is very easily and quickly applied, and which holds against release, and which finally can be easily and quickly disconnected when desired. Other objects and advantages will appear from the following description.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 3:
Fig. 3 is a transverse section taken on a plane substantially indicated by line III, Fig. 2.

In general, the invention involves a rugged metal rod or stem, having at one end a transverse rope-engaging hook and at the other end an eye to receive another rope, the hook being passed through a half-hitch loop of the rope to be connected, and the rope adjacent the loop being then engaged by the hook. By pulling the stem of the hook then, the hook is jammed down on the rope loop and the latter is tightened and locked. Any pull on the stem after that will simply tighten the hold. Thus, the metal stem 2 has at one end a transverse hook 3, and at the other end an eye 4. The hook 3 is preferably of some depth, and conveniently may be made by shaping heavy sheet stock into hook form as more clearly shown at Fig. 3. In this form of construction, the hook may be welded to the stem. The feature of the substantial depth in the hook is its providing additional rope-engaging surface, and correspondingly eliminating chance of flexible bend and disengagement by the rope.

Figure 1:
Fig. 1 is a side elevational view of connecting means in accordance with the invention, as applied for example, with a safety belt of a worker on a scaffold.
Figure 2:
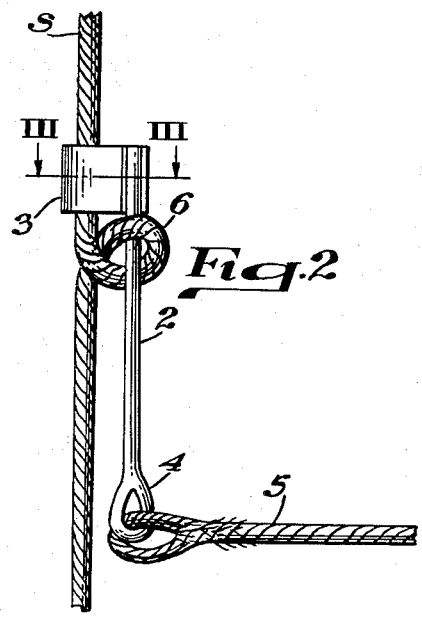
Fig. 2 is an enlarged side elevational view of the connection.

From the eye 4 a connecting rope 5 may lead to the workman's safety belt B, Fig. 1. Connection to the safety rope S may then be quickly made by forming a half-hitch loop 6 in the rope S and passing the hook 3 through the loop, and by lateral motion engaging the rope S into the hook; and then pulling down on the stem jams the hook against the loop and tightens the latter. The only way in which the hook can be disengaged from the rope S is to manually loosen the loop 6, and by a lateral movement disengage the hook from the rope and then withdraw the hook through the loosened and enlarged loop 6. In the event of a fall by a workman having the hook connected up as afore-described, the jerk and weight would merely tighten the grip on the loop, and the workman could immediately step back onto the scaffold.

In some cases the heavy sheet stock of the hook 3 may be slightly resilient to exert a spring-grip on the rope. Generally though, this is not necessary.

Figure 4:
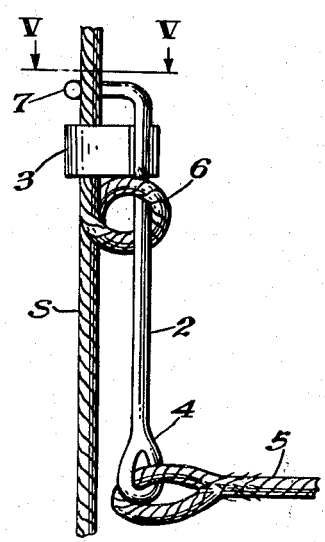
Fig. 4 is a side elevational view of a modified form.
Figure 5:
Fig. 5 is an end view of the same, taken on a plane substantially indicated by line V—V, Fig. 4.

In the form shown in Figs. 4 and 5, the stem 2 and the hook 3 are the same as foregoing, but the stem is prolonged beyond the hook and is bent to form a rope-engaging curved end 7. To engage this form with the rope S, a half-hitch loop 6 is made in the latter and the hook end is passed through, and the rope is sharply bent to pass into the hook 3 and under the end 7, and on then straightening out it is engaged by the end 7 and by the hook 3 both. Otherwise, the usage is the same as foregoing.

Figure 6:
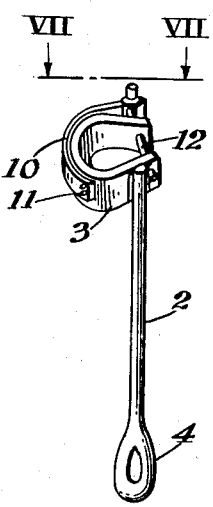
Fig. 6 is a perspective view of another modification.
Figure 7:
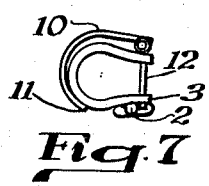
Fig. 7 is an end view of the same, looking in the direction of the arrows VII, Fig. 6.

In the modification shown in Figs. 6 and 7, the stem 2 and hook 3 are as afore-described, but in addition there is a spring 10 which is secured at 11 to the hook, and at its free end is pivoted to a pin 12, which passes through aligned holes in the ends of the hook. To connect this, the free end of the spring 10 is pulled back sufficiently to withdraw the pin 12 to clear the entrance into the hook, and while so held, the rope is engaged into the hook, and then the spring is released to force the pin 12 back into closure of the hook. This form adds an additional safety precaution which is desired by some users.

Other modes of applying the principle of the invention may be employed, change being made as regards the details described, provided the features stated in any of the following claims, or the equivalent of such, be employed.

I therefore particularly point out and distinctly claim as my invention:

1. A hook for detachably connecting an attaching rope with a vertically disposed suspension rope formed intermediate its length with a half hitch loop, said hook comprising a stiff metal rod constituting an elongated shank for the hook and being of a length adapting it to pass vertically through the loop and extend along a side of the suspension rope in spaced and substantially parallel relation thereto, an eye at the lower end of the shank for engagement by the outer end of the attaching rope, and a rope-engaging member carried by the upper portion of said rod formed of a strip of resilient sheet metal of appreciably greater width than thickness and having wide side faces and narrow upper and lower edge faces in abrupt angular relation to its side faces, said rope-engaging member being of horizontal U-shape in top plan and having an arcuate bridge portion of dimensions adapting it to fit about the suspension rope and merging into side arms which converge towards free ends between which the suspension rope is moved into the rope-engaging member, the said free ends of the arms of the rope-engaging member being spaced from each other a distance less than the thickness of the suspension rope, and said rope-engaging member being disposed transversely of said shank with the outer surface of the free end portion of one arm firmly secured against a side portion of the shank laterally thereof and the other arm of the rope-engaging member being spaced outwardly from the attached arm.

2. The structure of claim 1 wherein the rod has its upper portion projecting upwardly above the rope-engaging member and carrying an auxiliary rope-engaging member disposed above the first rope-engaging member transversely thereof and having an arm rigid with the rod and another arm extending in the direction of the connected ends of the arms of the first rope-engaging member and terminating in a portion for engaging about the suspension rope.

3. The structure of claim 1 wherein the rod has its upper portion projecting upwardly above the rope-engaging member and bent transversely to form a second rope-engaging member which is substantially L-shaped and has one arm integral with the rod and extending across the first rope-engaging member and its other arm extending in the direction of the connected arms of the first rope-engaging member and terminating in a curved portion for engaging about the suspension rope.

4. The structure of claim 1 wherein the rope-engaging member has free ends of its arms formed with aligned openings, a retainer pin extending across space between free ends of the arms of the rope-engaging member and slidable through the aligned openings, and a spring strip carried by the said rope-engaging member and extending towards the free end of one arm thereof and connected to one end of said pin and yieldably holding the pin against sliding movement in one direction.

References Cited in the file of this patent

UNITED STATES PATENTS

| Number | Name | Date |
| --- | --- | --- |
| 417,180 | Harvey | Dec. 10, 1889 |
| 471,159 | Wheeler | Mar. 22, 1892 |
| 641,038 | Reeves | Jan. 9, 1900 |
| 698,992 | Muller | Apr. 29, 1902 |
| 808,587 | Thompson | Dec. 26, 1905 |
| 1,109,276 | Barman | Sept. 1, 1914 |
| 1,389,833 | Kent | Sept. 6, 1921 |
| 1,398,887 | Bond | Nov. 29, 1921 |
| 1,807,314 | Humphreys et al. | May 26, 1931 |
| 1,814,900 | Deppe | July 14, 1931 |
| 2,295,021 | Weiss | Sept. 8, 1942 |
| 2,426,768 | Farmer | Sept. 2, 1947 |